Patented Dec. 27, 1949

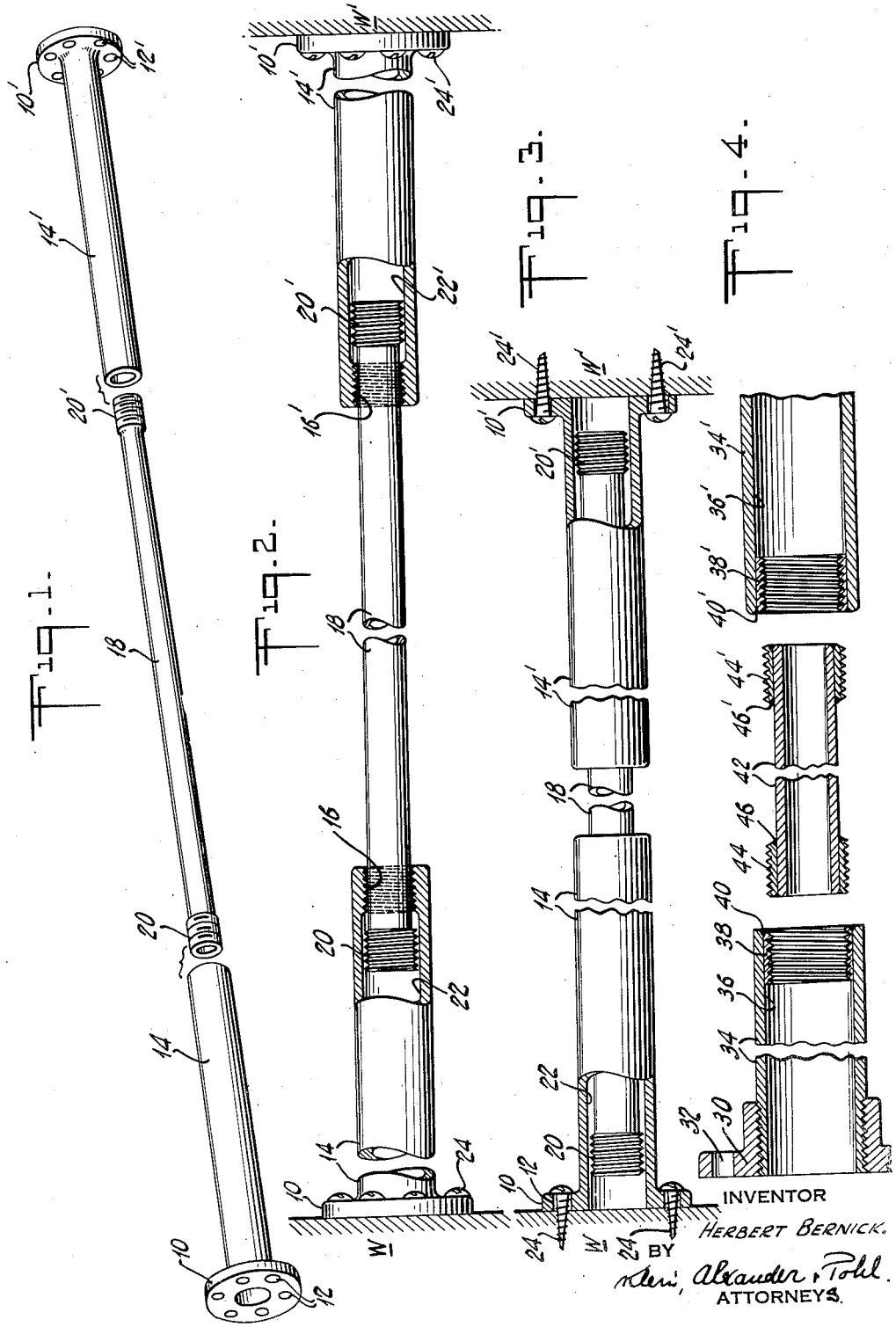

2,492,517

UNITED STATES PATENT OFFICE 2,492,517

GARMENT RACK

Herbert Bernick, New York, N. Y.

Application July 15, 1947, Serial No. 760,965

2 Claims. (Cl. 211—123)

This invention relates to garment racks, particularly of the type which fit from wall to wall of closets or the like and are secured at both ends upon such opposite walls.

The object of the invention is to provide a garment rack, pole or hanger which is made of a minimum number of parts, readily attachable to opposite walls of a clothes closet or the like, capable of wide range of adjustment to fit across spaces of different widths, practically incapable of collapsing and substantially free of sag.

In the drawings, Fig. 1 represents a perspective view of the three parts of this invention separately; Fig. 2 shows the three parts of the device in associated relation with opposite closet walls spaced at considerable width; Fig. 3 illustrates the same device of Figs. 1 and 2 secured to walls substantially closer together than those of Fig. 2; Fig. 4 shows a modification in part of the device of Figs. 1, 2 and 3.

The rack shown in Figs. 1, 2 and 3 consists of two securing end plates 10—10' provided with a multiplicity of screw holes 12—12', a pair of sleeves 14—14' integral with the plates 10—10' and an intermediate connecting member or rod 18. The intermediate connecting member 18 is provided at its ends with collars provided with screw threads 20—20', the diameter of such collars being slightly greater than the diameter of the body of the intermediate connecting member 18. The inner end surfaces of the sleeves 14—14' are provided with screw threads 16—16' to co-act with the corresponding threads 20—20'. The threads 16—16' and 20—20' are of such relation that the threads 20—20' may pass entirely beyond and inwardly of the threads 16—16' whereby the collars are slidably positioned within the sleeves 14—14'. The threads 20—20' are left and right hand screw threaded, respectively, in order that upon turning the rod 18, the screw thread portions thereof will simultaneously cooperate with the corresponding threads 16—16' on the rods. The screw thread ends of the rod 18 are preferably of such diameter in order that, when they clear the threads 16—16', they will tend to fit with a minimum of play into the internal spaces of the sleeves 14—14' and snugly contact the inner wall 22—22' of sleeves 14—14'. The end securing plates 10—10' are fixed to the opposite walls W—W' by a multiplicity of screws 24—24' passing through the screw holes 12—12'.

In order to secure the parts 14—14' and 18 together, it is preferred to assemble the rod 18 by interengaging the screw threads 16—16' and 20—20' and turning the rod until the screw threaded ends of the rod 18 pass beyond the threads 16—16' and enter into the internal space in the sleeves 14—14' and interengage the walls 22—22'. The sleeves 14—14' may then be slid with respect to the rod 18, in order that the securing plates 10—10' engage the opposite walls W—W' whereupon such plates are secured in place by the screws 24—24'. Fig. 2 shows a closet space which is comparatively wide as compared with the closet space illustrated in Fig. 3. In consequence the ends of the rod 18 do not telescope as deeply into the sleeves 14—14' in the wider space illustrated in Fig. 2 as they do in a narrower space illustrated in Fig. 3. If a closet space should be even wider than that of Fig. 2, the device will function with the added spread permitted the parts with the threads 16—16' and 20—20' interengaged provided of course that the space is not wider than the total possible capacity of the rod 18.

The device of Fig. 4 is a modification of that of Figs. 1, 2 and 3. In the device of the latter figures, the end plates 10—10' are integrally formed with the collars 14—14' and the connecting member 18 is made of a single section of tubing, the ends whereof are expanded to form the collars 20—20'. In Fig. 4 the end plates 30 (there being two like plates but only one of which is shown) are internally screw threaded and are attached to the wall W by a series of screws passing through the slots 32. The sleeves 34—34' are externally screw threaded at their ends for threaded relation with the screw threads of the end plates 30. The inner surface 36—36' of the sleeves 34—34' are smooth and are provided at their inner ends with screw threads 38—38' which are preferably separately formed internally on rings of metal welded on the surface 36—36' by the welds 40—40'. The connecting member 42 is provided with end collars having screw threads 44—44' on their outer surface to cooperate with the screw threads 38—38'. The collars carrying the threads 44—44' are secured to the member 42 by the welds 46—46'.

The five parts of Fig. 4 are assembled by screwing the two sleeves 34—34' to their respective end plates 30 and the connecting member 42 (the threads 44—44' of which are left and right hand threads), with the internal screw threads 38—38'. The connecting member 42 is rotated until the threads 44—44' are entirely clear of the threads 38—38' whereupon the ends of the member 42 may freely slide in the internal hollow portion of the collars 34—34', in much the same manner as the collars 20—20' slide in the hollows of the sleeves 14—14'.

The diameter of the body portion of the connecting member 18 and the diameter of the body portion of the connecting member 42 are respectively of less diameter than the diameter across the screw threaded portions 16—16 and 38—38' in order that the body portions of said connecting members may freely slide through the corresponding screw threaded portions.

The ends 20—20' and 44—44' of the connecting members 18 and 42 cannot escape from their respective sleeves by mere sliding relation inasmuch as the screw threaded ends of the connecting members cannot, by such motion, pass beyond the threaded portions of the sleeves.

I claim:

1. A garment rack comprising a pair of end sleeves, means to secure said sleeves, in spaced relation, to opposite walls or the like, a connecting member having a length greater than the distance apart of said sleeves left and right, screw threads at opposite end portions of said connecting member, said sleeves being hollow for a considerable portion of their length, the inner walls of said sleeves being screw threaded at their end portions, to engage, in screw threaded relation, the threads of said connecting member to permit the passage of said screw threaded end portions of said connecting member into said hollow portion in back of the screw threaded portions thereof, the diameter of the body of the connecting member being less than the diameter of the screw threaded hollow portions of said sleeves to permit the body of the connecting member to freely slide therethrough.

2. A garment rack, according to claim 1, in which the connecting member has expanded ends and the screw threads are carried by said expanded ends.

HERBERT BERNICK.

REFERENCES CITED

The following references are of record in the file of this patent:

UNITED STATES PATENTS

| Number | Name | Date |
|---|---|---|
| 457,977 | Wilkening | Aug. 18, 1891 |
| 466,940 | Fowler | Jan. 12, 1892 |
| 670,585 | Fowler | Mar. 26, 1901 |
| 763,844 | Benson | June 28, 1904 |
| 2,151,223 | Nayman | Mar. 21, 1939 |